(12) United States Patent
Fassnacht (10) Patent No.: US 8,922,050 B2
(45) Date of Patent: Dec. 30, 2014

(54) METHOD FOR CONTROLLING A POWER SUPPLY DEVICE HAVING AN INVERTER

(75) Inventor: Jochen Fassnacht, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 377 days.

(21) Appl. No.: 13/142,586

(22) PCT Filed: Dec. 17, 2009

(86) PCT No.: PCT/EP2009/067406
§ 371 (c)(1),
(2), (4) Date: Sep. 13, 2011

(87) PCT Pub. No.: WO2010/079074
PCT Pub. Date: Jul. 15, 2010

(65) Prior Publication Data
US 2012/0112528 A1 May 10, 2012

(30) Foreign Application Priority Data
Jan. 9, 2009 (DE) .......................... 10 2009 000 096

(51) Int. Cl.
*B60L 1/00* (2006.01)
*H02J 7/02* (2006.01)
*B60L 11/18* (2006.01)

(52) U.S. Cl.
CPC .................. *H02J 7/022* (2013.01); *Y02T 10/92* (2013.01); *Y02T 90/14* (2013.01); *Y02T 10/7005* (2013.01); *Y02T 90/127* (2013.01); *Y02T 10/7088* (2013.01); *B60L 11/1814* (2013.01)
USPC ............... 307/9.1; 307/10.1; 307/64; 307/66; 307/85; 307/86; 363/17; 363/95; 363/97; 363/131; 318/139; 320/116; 320/128

(58) Field of Classification Search
USPC ............ 307/9.1, 10, 1, 10.7, 64–66; 318/139; 714/22; 320/116, 128
See application file for complete search history.

(56) References Cited

U.S. PATENT DOCUMENTS

| 7,541,695 | B2 * | 6/2009 | Li ................................... 307/66 |
| 8,049,367 | B2 * | 11/2011 | Izumi et al. ..................... 307/66 |
| 2003/0155814 | A1 | 8/2003 | Gronbach |
| 2010/0224428 | A1 * | 9/2010 | Yamada et al. .............. 180/65.1 |
| 2010/0315024 | A1 * | 12/2010 | Najima et al. ................ 318/139 |
| 2011/0043173 | A1 | 2/2011 | Blaumeiser et al. |
| 2012/0187759 | A1 * | 7/2012 | Kamichi et al. ............. 307/10.1 |

FOREIGN PATENT DOCUMENTS

| CN | 1618645 | 5/2005 |
| CN | 1974261 | 6/2007 |
| CN | 101707388 | 5/2010 |
| DE | 69617026 | 6/2002 |
| DE | 10110615 | 9/2002 |

(Continued)

*Primary Examiner* — Rexford Barnie
*Assistant Examiner* — Jagdeep Dhillon
(74) *Attorney, Agent, or Firm* — Kenyon & Kenyon LLP (57) ABSTRACT

A method for controlling a power supply device for at least one electrical machine, having at least one storage device for electric energy (battery) and an inverter equipped with at least one reactor, the inverter having dual functions, being provided for charging (charge operation) the storage device from an in particular stationary power supply system, and for supplying the electrical machine with an alternating current in driving operation. A setpoint charge power is specified for the charge operation, and the reactor current is set accordingly by the inverter. Furthermore, a power supply device is also described.

9 Claims, 7 Drawing Sheets

(56) References Cited

FOREIGN PATENT DOCUMENTS

| DE | 10119985 | 10/2002 |
| DE | 102007043603 | 3/2009 |
| EP | 0 493 848 | 7/1992 |
| EP | 0603778 | 6/1994 |
| EP | 0849112 | 6/1998 |
| JP | 2008-193788 | 8/2008 |
| WO | WO2007/037240 | 4/2007 |

* cited by examiner

METHOD FOR CONTROLLING A POWER SUPPLY DEVICE HAVING AN INVERTER

FIELD OF THE INVENTION

The present invention relates to a power supply device and a method for controlling a power supply device having an inverter.

BACKGROUND INFORMATION

German Patent Application No. DE 101 10 615 describes a method for producing control pulses for power semiconductors, in particular for the purpose of generating offset control pulses for half-bridges, which pulses are recorded at multiphase converters or DC/DC converters. In this method the reference voltage is shifted by a delay time that corresponds to the offsets, or a PWM signal is shifted by a delay time that corresponds to the duration of the period divided by the number of offsets.

German Patent Application No. DE 101 19 985 A1 describes a device for feeding power into a multi-voltage on-board electrical system of a motor vehicle. This device has a multi-voltage vehicle electrical system situated in a motor vehicle, which system supplies at least one first and one second voltage level, each differing from the reference potential. The multi-voltage vehicle electrical system is powered from at least one electrical energy accumulator. It furthermore includes at least one converter for connecting the two voltage levels. In addition, a feeding arrangement is provided for the external feeding of power into the multi-voltage vehicle electrical system. The mentioned converter can be implemented in the form of a multiphase converter. In such converters, several converter cells of lower capacity are connected in parallel, and the power circuits are clocked in a time-staggered manner. This allows filter components to be dispensed with on account of the effects of destructive interference. Such multiphase converters make it possible to realize the first and second converters using the available phases of a single multiphase converter. To this end, the phases are divided up into converters having the function of a step-down and step-up transformer. Via a switch, the phases are then separated inside the converter, on the input side.

German Patent Application No. DE 10 2007 043 603.5 describes a multiphase DC/DC converter which has a plurality of converter cells that a disposed parallel to each other and are clocked at a time offset. A magnetic measuring bridge is disposed between the outputs of two converter cells in each case.

German Patent Application No. DE 696 17 026 T2 describes a system for charging a battery of accumulators of a motor vehicle from a single-phase voltage source; in this case, the motor vehicle is equipped with a three-phase current drive motor having three windings and an inverter having three interrupters for the supply of the three-phase current motor, and an arrangement is provided for operating said inverter as AC voltage/DC voltage converter having a rectifier voltage step-up stage, which include a first and a second interrupter branch of the inverter, a voltage step-down stage having a third interrupter branch of the inverter, and an arrangement for connecting the center tap of the first and second interrupter branch to the single-phase voltage source, the center tap of the third interrupter branch to the battery for the supply of DC voltage. In the system, the center taps of the first and second interrupter branch are connected to said single-phased voltage source via a first inductivity, which is made up of at least one winding of the three-phase current motor. Furthermore, the center tap of the third interrupter branch is connected to the battery via a second inductivity, which is made up of at least one winding of said three-phase current motor that differs from the winding(s) that form(s) the first inductivity.

An electric vehicle or a so-called plug-in hybrid vehicle, that is to say, a hybrid vehicle whose batteries can be recharged on the electricity network, usually includes at least one three-phase inverter for controlling an electrical three-phase current machine for the traction of the electric vehicle. Such an inverter may also be used for withdrawing energy from the power supply system or for injecting energy into the power supply system, in cooperation with line reactors. This is used in elevator drives or crane drives, for example. In this context, the intermediate circuit is first charged slowly to a voltage just above the rectified system voltage with the aid of a precharge contactor having resistors, whereupon the inverter is employed as boost chopper, which rectifies the three-phase system current or which inverts the direct current in the intermediate circuit into a three-phase current system. In the conventional applications, the system currents are set by the inverter based on the voltage deviation in the intermediate circuit from a setpoint value, and possibly also on the basis of a load current. For use as battery charge device, however, a different type of control of the inverter must be implemented, because in this case the desired quantity to be set is the battery charge current and not the desired intermediate circuit voltage.

SUMMARY

An object of the present invention is to provide a method for the control of a current supply device having an inverter.

The present invention may enable an especially advantageous control of a current supply device having an inverter, which current supply device is suitable as a compact and cost-effective subassembly, especially for mobile applications, in particular for use in an electric vehicle. The inverter, serving dual functions, is used for at least two operating modes. In a first mode, the mobile operating mode, the inverter supplies the AC voltage required for the drive motor of the electric vehicle by corresponding conversion of the DC voltage withdrawn from the onboard energy accumulator. In a second operating mode, which generally is a stationary operating mode, the charge operation, the inverter is connected to a power supply system and converts the voltage supplied by this system into a voltage that is suitable for recharging the onboard battery. In one especially advantageous development variant, a dc voltage converter, which is connected between the inverter and the battery circuit, is provided in addition. This makes it easier to set optimum charge conditions for the battery.

BRIEF DESCRIPTION OF THE DRAWINGS

Exemplary embodiments of the present invention are explained in greater detail below with reference to the figures.

DETAILED DESCRIPTION OF EXAMPLE EMBODIMENTS

The present invention a control arrangement which, for one, enables the operation of an inverter for the supply of a drive motor of an electric vehicle from an onboard energy accumulator and, for another, an operation as charge device for the energy accumulator. When used as charge device, the inverter is connected to three phases, or to at least one phase and the neutral conductor of a generally stationary power supply system, and operates in rectifier mode, which is to say, it withdraws energy from the power supply and uses it to charge the battery. The state or control quantities of this inverter are the choking currents $I_{L1}, I_{L2}, I_{L3}$, the third current value being derivable from the two other current values. The choke currents correspond to the system currents. In order for the inverter to be able to set the choke currents via the selection of suitable voltage vectors, the intermediate circuit voltage, and thus the battery voltage, must be greater than the rectified system voltage. Otherwise, the battery would be charged in uncontrolled manner via the rectifier diodes, and an impermissibly high charge current might flow in the process. Since the battery management system of the vehicle has the current characteristic quantities of the battery available and thus knows exactly which charge current or which charge power is most useful, it is advantageous that the battery management system specifies the setpoint charge current or the setpoint charge power. However, the inverter is able to set only the choke currents directly. The required conversion of the charge current or the charge power into a corresponding choke current, and the specification of it to the current control device of the inverter relates to the core point of the present invention.

The conversion of the charge power into the three-phased setpoint line currents via the power balance is as follows, when the peak value is specified:

$$\hat{I}_{L\_Setpoint} 2 \cdot \frac{U_{Batt} \cdot I_{Batt\_Setpoint}}{\sqrt{3} \cdot \hat{U}_{System}}, \tag{1}$$

where $I_{L\_setpoint}$=setpoint choke current, peak value
$U_{Batt}$=battery voltage
$I_{Batt\_Setpoint}$=battery current, setpoint value.

When using the setpoint charge power according to the present invention, the following relation results:

$$\hat{I}_{L\_Setpoint} = 2 \cdot \frac{P_{Batt\_Setpoint}}{\sqrt{3} \cdot \hat{U}_{System}}, \tag{2}$$

where $I_{L\_setpoint}$=setpoint choke current, peak value
$P_{Batt\_Setpoint}$=setpoint charge power.

The peak values, converted into the instantaneous line-synchronized setpoint current values, result in $$\hat{i}_{L1\_Setpoint} = \hat{I}_{L\_Setpoint} \cdot \sin(\omega t); \tag{3}$$

$$\hat{i}_{L2\_Setpoint} = \hat{I}_{L\_Setpoint} \cdot \sin(\omega t + 120°); \tag{4}$$

$$\hat{i}_{L3\_Setpoint} = \hat{I}_{L\_Setpoint} \cdot \sin(\omega t + 240°). \tag{5}$$

The phase angle results from the synchronization to the power supply system to which the power supply device is connected for the charge operation. If only a single-phase power supply is used for charging, the present invention is able to be used as well. In that case, the following formulas result:

$$\hat{I}_{L\_Setpoint} = 2 \cdot \frac{U_{Batt} \cdot I_{Batt\_Setpoint}}{\hat{U}_{System}} \tag{6}$$

$$\hat{I}_{L\_Setpoint} = 2 \cdot \frac{P_{Batt\_Setpoint}}{\hat{U}_{System}} \tag{7}$$

$$\hat{i}_{L\_Setpoint} = \hat{I}_{L\_Setpoint} \cdot \sin(\omega t) \tag{8}$$

Figure 1:
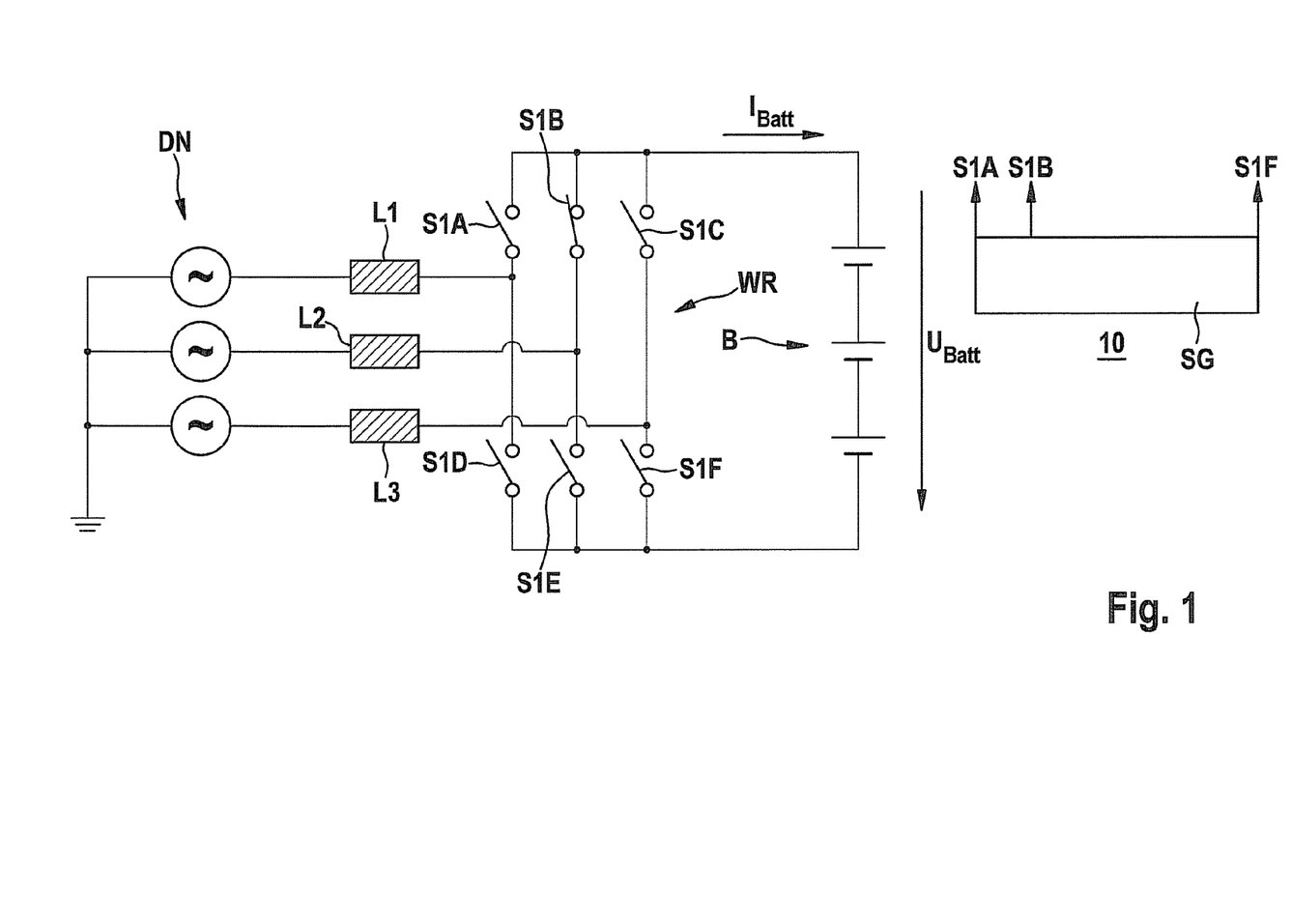
FIG. 1 shows the schematic structure of an inverter as charge device.

FIG. 1 shows the use of an inverter as charge device for a battery in a schematic illustration. Circuit system 10 shown in FIG. 1 includes a battery B, which is connected to a schematically illustrated three-phase current system DN via an inverter WR for charging purposes. Inverter WR has three branches, each including two circuit elements S1A, S1D, S1B, S1E and S1C, S1F which are connected in series. The circuit elements are connected to a control device SG and controllable by it. Each junction of the circuit elements in each of the three branches of inverter WR is connected to a first connection of a reactor L1, L2, L3. The respective other connection of reactor L1, L2, L3 is connected to a phase of three-phase supply system DN. By controlling circuit elements S1A, S1D, S1B, S1E and S1C, S1F with the aid of control device SG, a voltage $U_{ZK}$ comes about in the intermediate circuit, which causes a current flow $I_{Batt}$ through battery B and thereby recharges it. By suitable control of the circuit elements of the inverter (a valve typically is made up of a transistor having a diode that is switched in anti-parallel manner), a three-phased current system is able to be generated in $IL_1, IL_2, IL_3$. The generation of the switching pattern for the transistors requires a setpoint current value for each phase, which value is calculated according to (3), (4) and (5). An underlying current control sets this setpoint value for each phase. The output value of the underlying current control in turn is a setpoint voltage value for each phase, which is set via a PWM method (pulse-width modulation method), for example, or a similar modulation method, in that a suitable switching pattern is specified for the circuit elements.

Figure 2:
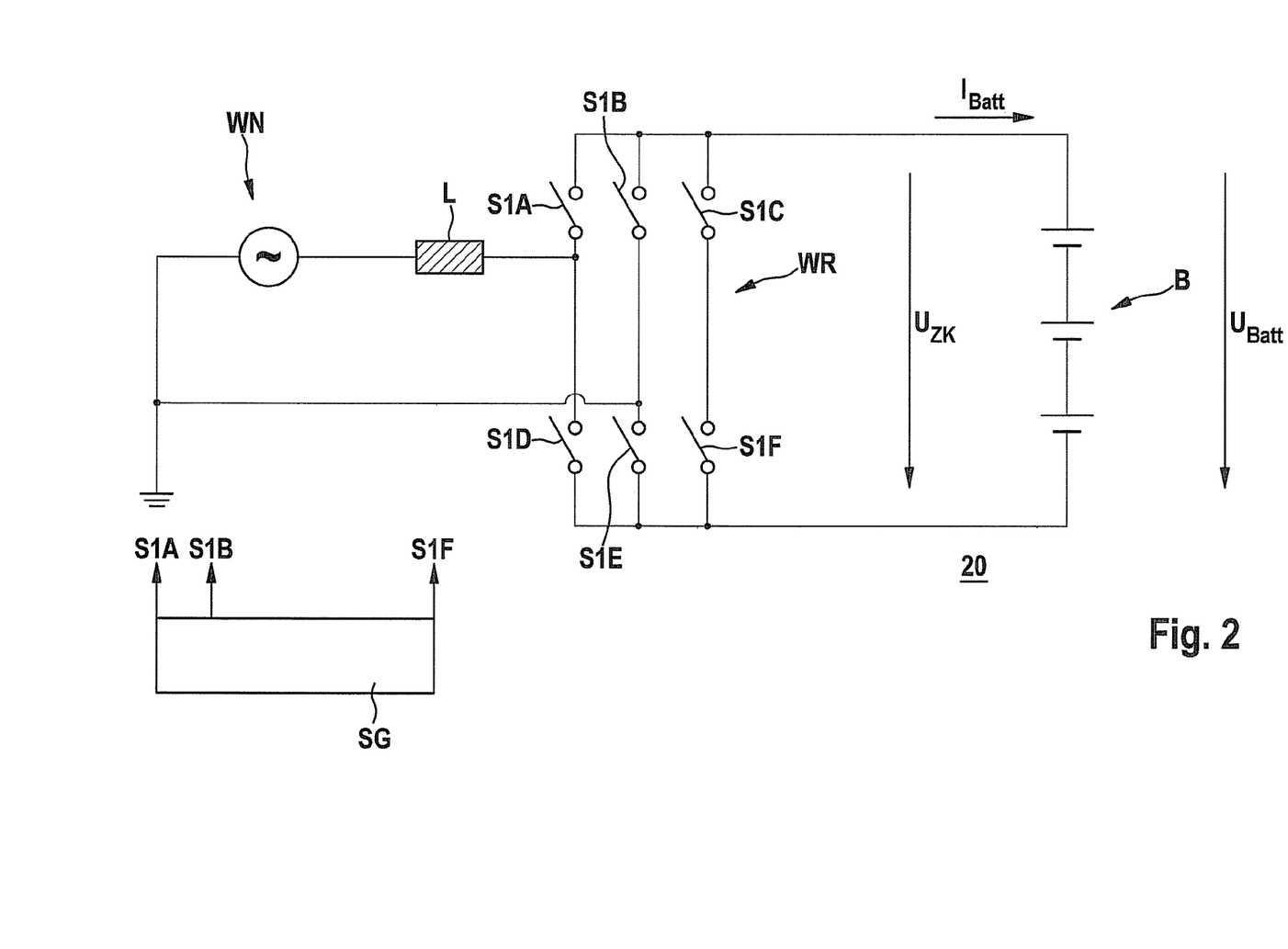
FIG. 2 shows the connection of an inverter to a single-phase AC system.

In a schematic illustration, FIG. 2 shows the use of an inverter as charging device for a battery when connected to an AC system WN. Circuit system 20 shown in FIG. 2 includes a battery B which, for charging purposes, is connected to a schematically illustrated AC system WN via an inverter WR. Inverter WR has three branches, each including two circuit elements S1A, S1D, S1B, S1E and S1C, S1F which are switched in series. The circuit elements are connected to a control device SG, which is able to control them. The junction of circuit elements S1A, S1D in a first branch of inverter WR is connected to a first connection of a reactor L, whose second connection is connected to a phase line of AC system WN. The junction of circuit elements S1B, S1E in a second branch of inverter WR is connected to the neutral conductor of AC system WN. By controlling circuit elements S1A, S1D, S1B, S1E and S1C, S1F via control device SG, a voltage $U_{ZK}$ that leads to a battery current $I_{BATT}$ which charges battery B comes about in the intermediate circuit. The method of functioning of the circuit system shown in FIG. 2 is generally analogous to the circuit system shown in FIG. 1, with the exception that only two half-bridges of the inverter are controlled. The half-bridge having circuit elements S1C and S1F remains blocked. The setpoint value of the underlying control of the coil current (for the current through coil L) is defined by formula (8). The underlying control of the current of reactor L in turn outputs a setpoint voltage value to a pulse-width modulation or some similar arrangement. The pulse-width modulation generates control signals for the circuit elements such that, on average, the setpoint voltage is applied and thus the desired current is flowing through reactor L.

Figure 3:
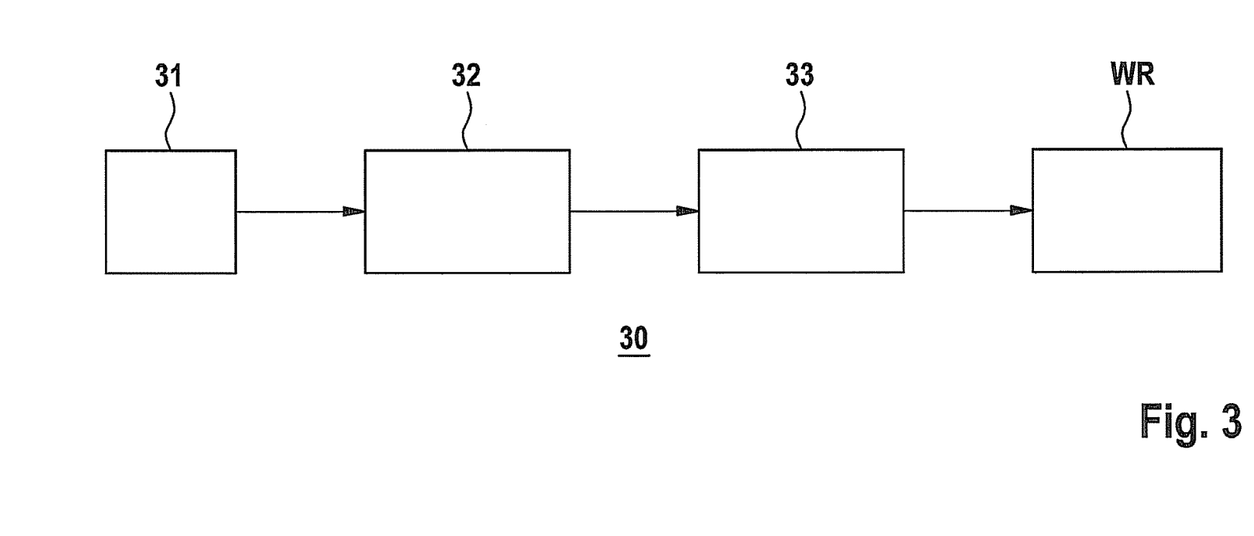
FIG. 3 shows a block diagram to elucidate the setpoint input for the inverter.

FIG. 3 shows a block diagram 30 to elucidate the setpoint input. Shown is a first functional module 31, which specifies a setpoint charge current, for example. First functional module 31 is connected to a second functional module 32, which converts the specified setpoint charge current into setpoint system currents. Second functional module 32 is connected to a third functional module 33, which in turn is connected to an inverter WR and brings about a control of the system current of inverter WR. Functional module 31 specifies a setpoint charge value (battery current or power), which it calculates based on the desired charge duration, charge quantity or the potential charge power, for example. Functional module 32 uses this value to calculate the coil or setpoint system current at any given instant. This current is then set by the underlying current control (functional module 33) and a corresponding modulation method (e.g., PWM). Toward this end, corresponding control signals for the circuit elements of the inverter are formed and forwarded to them.

Figure 4:
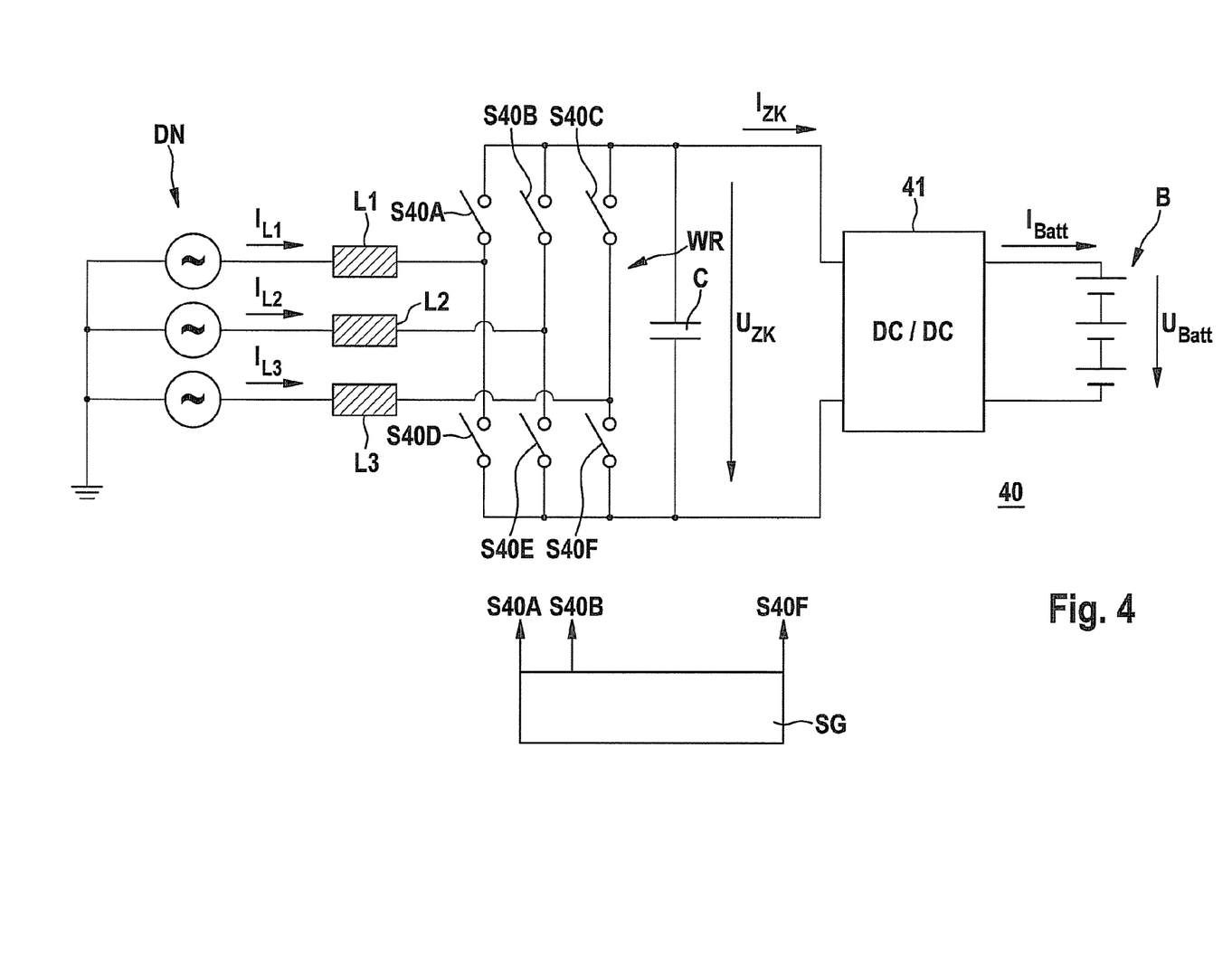
FIG. 4 shows the schematic illustration of an inverter having a downstream DC voltage converter.

FIG. 4 shows a circuit system 40 having an additional DC voltage converter 41 between an inverter WR and a battery B. Inverter WR includes three branches, each having two circuit elements S40A, S40B, S40C, S40D, S40E, S40F connected in series. The mentioned circuit elements are connected to a control device SG, which is able to control them. Each branch of inverter WR is connected to a phasing line of a three-phase current system DN via an individual reactor L1, L2, L3. A capacitor C, at which a voltage $U_{ZK}$ comes about by control of the mentioned circuit elements, is disposed in an intermediate circuit. This voltage $U_{ZK}$ is supplied to DC voltage converter 41, which supplies a voltage that is suitable for charging battery B on the battery side. This results in a charge current $I_{BATT}$, which charges battery B. Here, it suggests itself to impress a setpoint charge power or a setpoint charge current upon dc voltage converter 41, as specified by functional module 31 (FIG. 3), for example. Functional module 31 may advantageously be a circuit system which also brings about a management of battery B. Inverter WR connected to system DN is used for the constant control of voltage $U_{ZK}$. The specification of power or current as setpoint value for DC voltage converter 41 now is based on the inventive thought. This variant of an embodiment provides advantages if the rectified system voltage is greater than the battery voltage.

Figure 5:
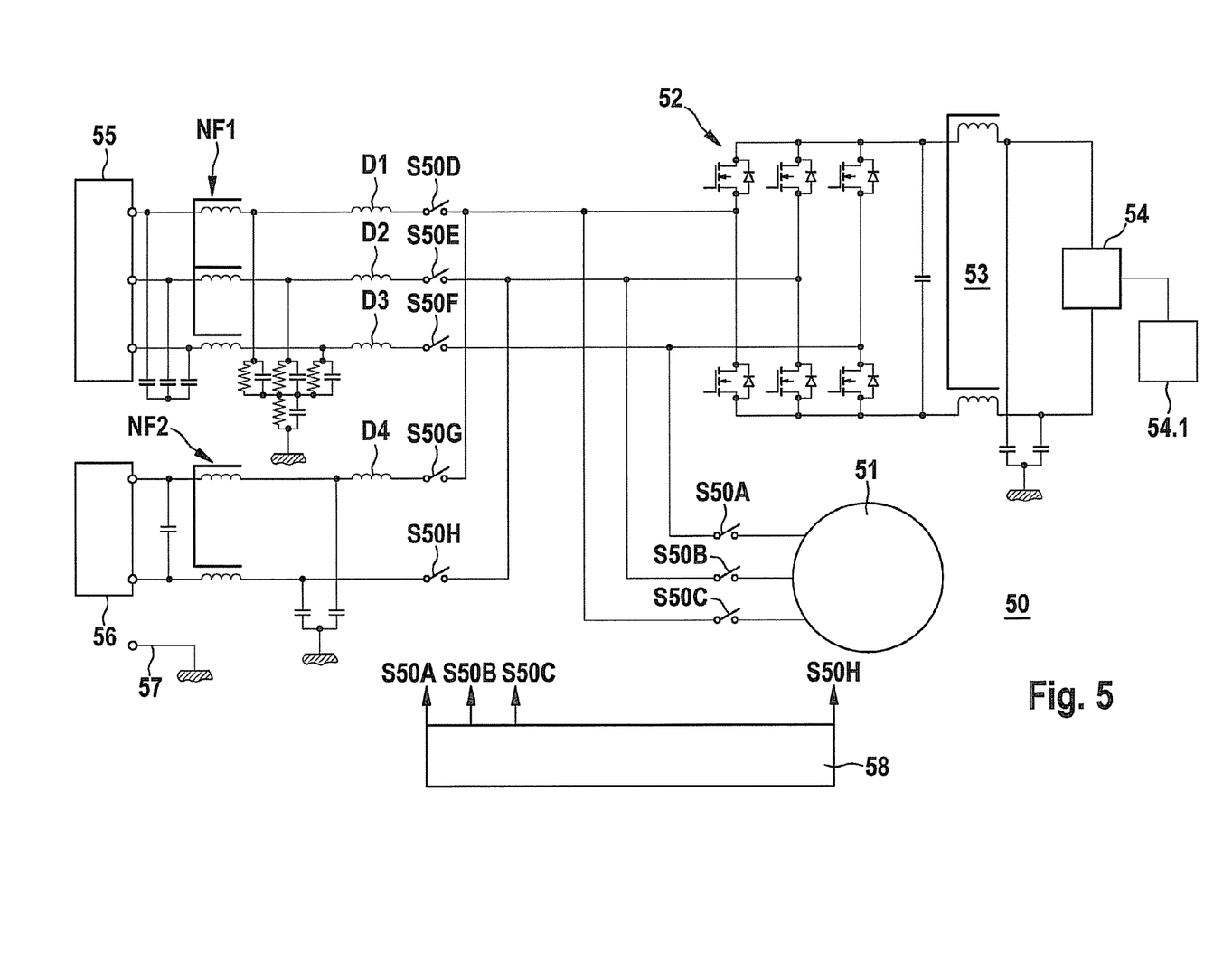
FIG. 5 shows a first exemplary embodiment of a power supply device implemented according to the present invention.

Circuit system 50 shown in FIG. 5 shows a cost-effective variant of an embodiment of an inverter used for dual functions. Savings once again are derived from the fact that a charging device for the battery and an inverter for the traction of the vehicle are combined in order to save component costs. Circuit system 50 includes an electrical machine 51 and an inverter 52. Circuit elements S50A, S50B, S50C are disposed between electrical machine 51 and inverter 52. Depending on the switching position of these circuit elements, electrical machine 51 is connected to inverter 52 or disconnected from it. Via an EMC filter 53, inverter 52 is connected to vehicle electrical system 54. Circuit system 50 additionally includes circuit elements 50D, 50E, 50F, via which inverter 52 is optionally able to be connected to a three-phase current supply system 55. In addition, line reactors D1, D2, D3 and a power-line filter NF1 are connected to the lead wires to three-phase supply network 55. In the interest of a universal and flexible energy supply of the electric vehicle, the inverter may optionally also be connected to a single-phase AC system 56. For this purpose, circuit elements 50G and 50H are provided between inverter 52 and the lead wires to AC system 56. Furthermore, a power-line filter NF2 and a line reactor D4 are disposed in the current path between AC system 56 and inverter 52. Reference numeral 57 denotes an earthing line, which is able to be connected to ground of power supply systems 55, 56. Circuit elements 50A, 50B, 50C, 50D, 50E, 50F, 50G, 50H are controllable via a control device 58, which is mechanically and electrically linked to the circuit elements.

In the following text, the method of functioning of the circuit system illustrated in FIG. 5 will be explained briefly. Two operating modes of the electric vehicle may basically be differentiated. That is, the autonomous driving operation on the one hand, and the charge operation on the other. Autonomous driving operation means that the electric vehicle is supplied with energy from onboard sources exclusively, in particular from at least one battery. During charge operation, the electric vehicle is connected to a stationary power supply system, so that the onboard battery is able to be charged. During driving operation of the electric vehicle, when no electrical connection to a stationary power supply system exists, circuit elements 50, 50B, 50C are closed by control device 58, according to the corresponding control. Circuit elements 50D, 50E, 50F, 50G, 50H, on the other hand, are open. Therefore, electrical machine 51 of the electric vehicle is connected to inverter 52 and supplied with operating current by it. The inverter receives the energy required for this purpose from a battery 54.1, which is part of the vehicle electrical system 54. In charge mode, on the other hand, circuit elements 50A, 50B, 50C are open, so that no current-conducting connection exists between electrical machine 51 and inverter 52. The switching position of circuit elements 50D, 50E, 50F or 50G, 50H depends on whether a three-phase current system 55 or a simple AC system 56 is available for the charge operation. In a connection to a stationary three-phase current system 55, circuit elements 50D, 50E, 50F are closed, this switching position once again being controlled by control device 58. Inverter 52 thus is connected to three-phase current system 55 via the three phase lines and neutral wire 57. If only a stationary single-phase AC system is available for a charging operation, then circuit elements 50G, 50H are closed, controlled by control device 58. The inverter is then connected to AC system 56. If the vehicle is operating in normal driving operation, then the electrical machine provided as motor is connected to the inverter, which sets the required motor current.

Figure 6:
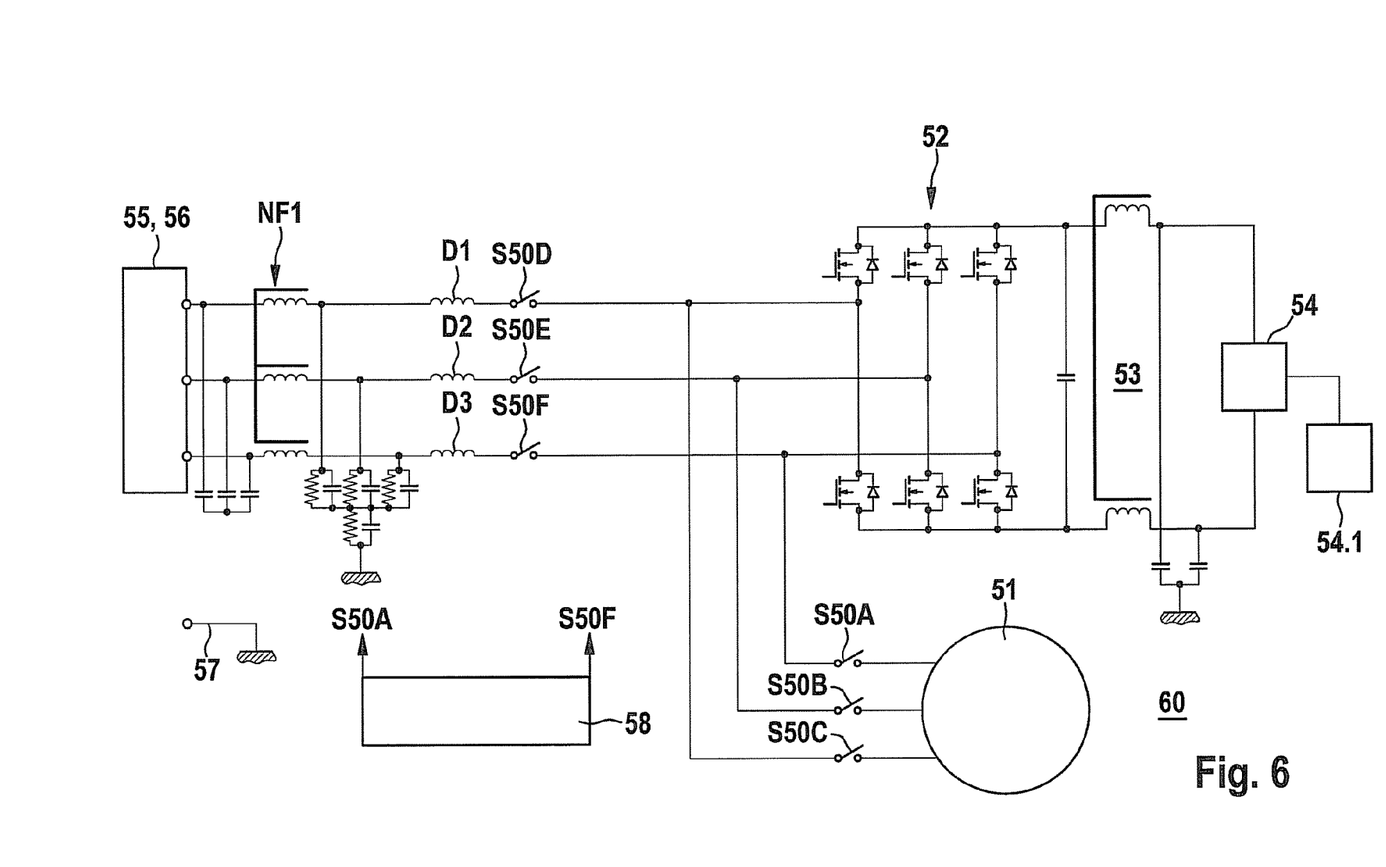
FIG. 6 shows a second exemplary embodiment of a power supply device implemented according to the present invention.

FIG. 6 shows a variant of an embodiment in which a single-phased line connection is integrated into the three-phase system connection, which makes it possible to reduce the costs due to savings in components. Circuit system 60 shown in FIG. 6 includes an electrical machine 51, which is connected to an inverter 52 via three phase lines. Inverter 52 is connected to vehicle electrical system 54 via an EMC filter. Vehicle electric system 54 includes at least one battery 54.1 for energy storage. Circuit elements S50A, S50B, S50C, which are controllable by a control device 58, are disposed in the connection lines between electrical machine 51 and inverter 52.

Furthermore, inverter 52 is connectable via a connection device to a power supply system. The connection device includes a power-line filter NF1 and an individual reactor D1, D2, D3 in each connection line, as well as a circuit element S50D, S50E, S50F. The switching position of the aforementioned circuit elements is likewise controllable via control device 58. Below the method of functioning of this variant of an embodiment is outlined briefly. Two operating states are examined. In the first operating state, i.e., driving operation, the energy required for operating electrical machine 51 is withdrawn from an onboard energy accumulator, that is to say, the at least one battery 54.1. Inverter 52 converts the dc voltage withdrawn from battery 54.1 into an alternating voltage suitable for electrical machine 51, and supplies it to it via the connection lines, which are closed for this purpose. Circuit elements S50A, S50B, S50C are therefore controlled into a closed switching position by control device 58. In the second operating mode, i.e., charge operation, circuit elements S50A, S50B, S50C are open and circuit elements S50D, S50E, S50F are closed. Via closed circuit elements S50D, S50E, S50F and reactors D1, D2, D3 as well as neutral conductor 57, inverter 52 thus is connected in three-phased manner to a three-phase current system 55. As an alternative, a connection to a single-phased AC system 56 may be established.

Figure 7:
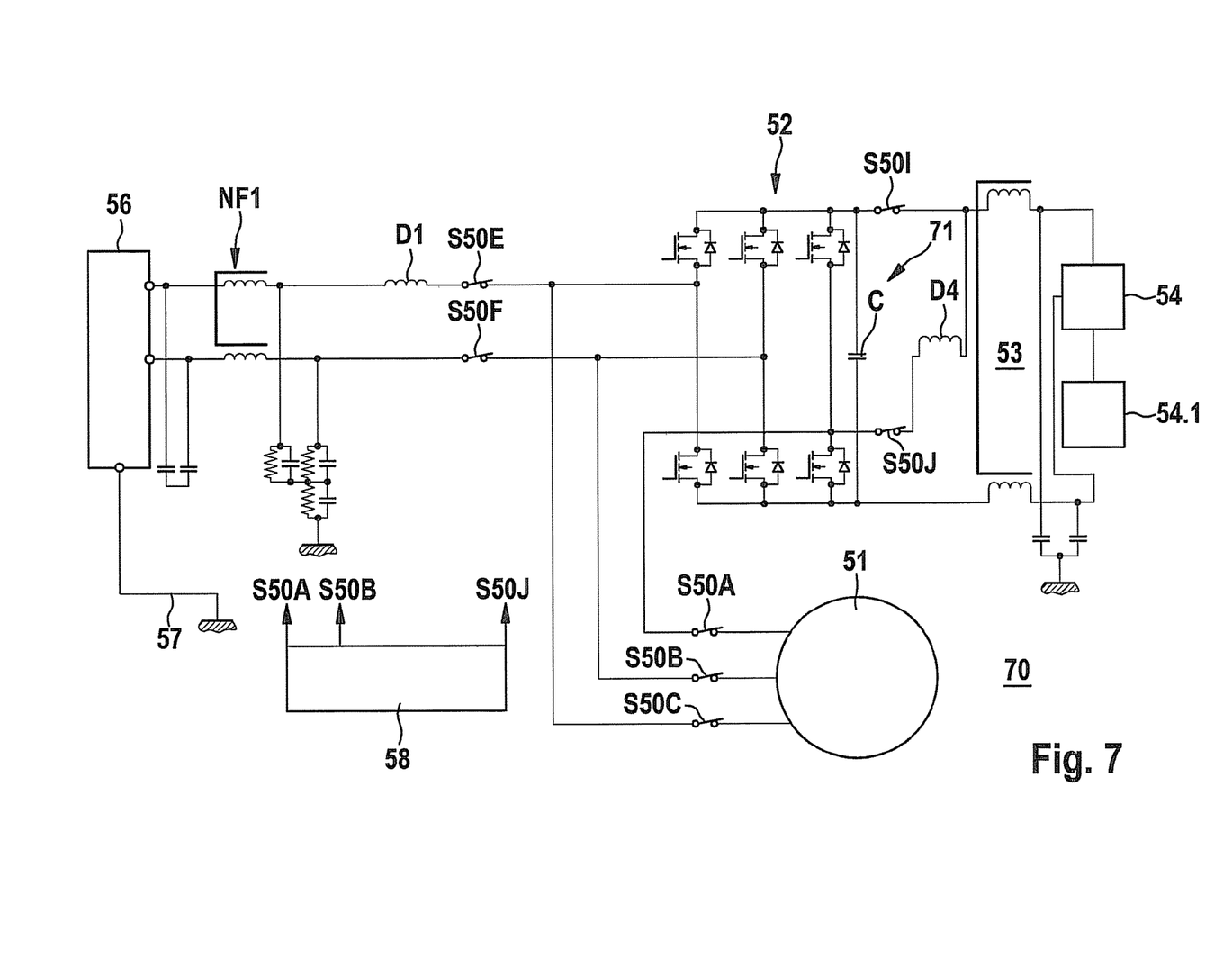
FIG. 7 shows a third exemplary embodiment of a power supply device implemented according to the present invention.

FIG. 7 shows a variant of an embodiment, which is particularly advantageous for a connection to an AC network 56 during a charge operation. Circuit system 70 shown in FIG. 7 once again includes an electrical machine 51 and an inverter 52 assigned to this machine 51. Inverter 52 is connected to vehicle electrical system 54 via an EMC filter 53. Vehicle electrical system 54 includes at least one battery 54.1 as energy accumulator. In addition, circuit system 70 includes a connection device, which makes it possible to connect inverter 52 to an AC system 56 during a charge operation. The connection device includes a power-line filter NF1, at least one line reactor D1, as well as two circuit elements S50E and 850F. Three additional circuit elements S50A, S50B, S50C are disposed in the supply lines between inverter 52 and electrical machine 51. Furthermore, two circuit elements S50I and S50J are situated in connection lines between the inverter and EMC filter 53. A reactor D4 is connected in series to circuit element S50J. A control device 58 is provided for the control of said circuit elements. In this circuit system 70, as well, two operating modes can be distinguished. In the first operating mode, i.e., driving operation, electrical machine 51 is connected to inverter 52 in three-phased manner. Toward this end circuit elements S50A, S50B, S50C are closed. Furthermore, circuit element S50I is closed, and circuit element S50J is open. Circuit elements S50E and S50F, too, are open in this operating mode. In this driving operation, inverter 52 withdraws energy in the form of a direct current from battery 54.1 and converts it into an alternating current for electrical machine 51. In the second operating mode, i.e., charge operation, inverter 52 is connected to a stationary AC system 56. For this purpose the switch positions of the circuit elements are controlled by control device 58 in the following manner. Circuit elements S50E, S50F and S50J are closed, while circuit elements S50A, S50B, S50C and S50I are open. In this operating mode, two half-bridges of inverter 52 are thus connected to one phase and the neutral conductor of AC system 56 and used for rectifying and raising the system voltage withdrawn from AC system 56. The third half-bridge of inverter 52 functions as DC voltage converter, in cooperation with a reactor 4. In driving operation, i.e., when electrical machine 51 is supplied via inverter 52, the voltage in the intermediate circuit, i.e., the voltage at intermediate circuit capacity C, is essentially equal to the voltage of vehicle electric system 54. In comparison, during charge operation the voltage in the intermediate circuit may be higher than the voltage of vehicle electric system 54. This makes it possible to adapt the voltage of the intermediate circuit to different supply voltages in a flexible manner.

The invention claimed is:

1. A method for controlling a power supply device for at least one electrical machine, having at least one storage device for electric energy and an inverter equipped with at least one reactor, the inverter being provided via switchable circuit elements for dual functions, for charging the at least one storage device from a stationary power supply system and for supplying the electrical machine with an alternating current in driving operation, the method comprising:

in a first mode of operation, connecting the inverter via a first subset of the switchable circuit elements to the electrical machine for supplying electrical energy of the at least one storage device to the electrical machine via the inverter and disconnecting the inverter from the power supply system by opening a second subset of the switchable circuit elements;

in a second operating mode, connecting the inverter via the second subset of the switchable circuit elements to the power supply system for charging the at least one storage device via the inverter and disconnecting the inverter from the electrical machine by opening the first subset of switchable circuit elements;

specifying a setpoint charge power for the charge operation; and setting by the inverter, a reactor current for a three-phased operation according to the following relationship $$\hat{i}_{L\_Setpoint} = 2 \cdot \frac{P_{Batt\_Setpoint}}{\sqrt{3} \cdot \hat{U}_{System}}$$

and for a single-phase operation according to the following relationship $$\hat{i}_{L\_Setpoint} = 2 \cdot \frac{P_{Batt\_setpoint}}{\hat{U}_{System}},$$

where $P_{Batt\_Setpoint}$ = setpoint charge power $I_{L\_Setpoint}$ = peak value of the setpoint system current; setpoint reactor current.

2. The method as recited in claim 1, wherein a setpoint current is specified for the charge operation, and the inverter sets the reactor current for a three-phased operation according to the following relationship $$\hat{i}_{L\_Setpoint} = 2 \cdot \frac{U_{Batt} \cdot I_{Batt\_Setpoint}}{\sqrt{3} \cdot \hat{U}_{System}}$$

and for a single-phase operation according to the following relationship $$\hat{I}_{L\_Setpoint} = 2 \cdot \frac{U_{Batt} \cdot I_{Batt\_Setpoint}}{\hat{U}_{System}}$$

$\hat{I}_{L\_Setpoint}$=setpoint reactor current,
$U_{Batt}$=battery voltage
$I_{Batt\_Setpoint}$=setpoint charge current.

3. A power supply device, comprising:
a power supply device including a connection device for connecting the power supply device to a power supply system; and
circuit elements, wherein in a first operating mode, a first subset of the circuit elements are switched to connect an inverter equipped with at least one reactor to an electrical machine and a second subset of the circuit elements are opened to disconnect the inverter from the power supply system, and in a second operating mode the second subset of the circuit elements are switched to connect the inverter to the power supply system via the connection device and the first subset of the circuit elements are opened to disconnected the inverter from the electrical machine, wherein the inverter is configured to set a reactor current for a three-phased operation according to the following relationship $$\hat{I}_{L\_Setpoint} = 2 \cdot \frac{P_{Batt\_Setpoint}}{\sqrt{3} \cdot \hat{U}_{System}}$$

and for a single-phase operation according to the following relationship $$\hat{I}_{L\_Setpoint} = 2 \cdot \frac{P_{Batt\_setpoint}}{\hat{U}_{System}},$$

where
$P_{Batt\_Setpoint}$=setpoint charge power
$I_{L\_Setpoint}$=peak value of the setpoint system current; setpoint reactor current.

4. The power supply device as recited in claim 3, further comprising:
a control device for controlling the circuit elements.

5. The power supply device as recited in claim 3, wherein the connection device allows the power supply device to be connected to a three-phase supply system or an AC system.

6. The power supply device as recited in claim 3, wherein a reactor is provided, which, together with a half-bridge of the inverter, forms a DC voltage converter, which is connected between the inverter and a storage device for electrical energy.

7. The power supply device as recited in claim 3, wherein the power supply device includes a circuit element, which is open in driving operation and closed in charge operation in order to connect the reactor to a half-bridge of the inverter.

8. The power supply device as recited in claim 3, wherein a circuit element is provided in a connection line between the inverter and an EMC filter, the circuit element being closed in driving operation and open in charge operation.

9. An electric vehicle, comprising:
a power supply device including a connection device for connecting the power supply device to a power supply system; and
circuit elements, wherein in a first operating mode, a first subset of the circuit elements are switched to connect an inverter equipped with at least one reactor to an electrical machine and a second subset of the circuit elements are opened to disconnect the inverter from the power supply system, and in a second operating mode the second subset of the circuit elements are switched to connect the inverter to the power supply system via the connection device and the first subset of the circuit elements are opened to disconnected the inverter from the electrical machine;
wherein the inverter is configured to set a reactor current for a three-phased operation according to the following relationship $$\hat{I}_{L\_Setpoint} = 2 \cdot \frac{P_{Batt\_Setpoint}}{\sqrt{3} \cdot \hat{U}_{System}}$$

and for a single-phase operation according to the following relationship $$\hat{I}_{L\_Setpoint} = 2 \cdot \frac{P_{Batt\_setpoint}}{\hat{U}_{System}},$$

where
$P_{Batt\_Setpoint}$=setpoint charge power
$I_{L\_Setpoint}$=peak value of the setpoint system current; setpoint reactor current.

* * * * *